United States Patent [19]

Fellmeth et al.

[11] Patent Number: 4,610,585
[45] Date of Patent: Sep. 9, 1986

[54] CHUCK FOR USE WITH A CUTTING TOOL

[75] Inventors: Günther Fellmeth, Rechberghausen; Willi Jester, Herten-Westerholt, both of Fed. Rep. of Germany

[73] Assignee: Fried. Krupp Gesellschaft mit beschränkter Haftung, Essen, Fed. Rep. of Germany

[21] Appl. No.: 530,083

[22] Filed: Sep. 7, 1983

[30] Foreign Application Priority Data

Sep. 7, 1982 [DE] Fed. Rep. of Germany ....... 3233133

[51] Int. Cl.⁴ .......................... B23C 9/00; B23B 31/10
[52] U.S. Cl. ........................................ 409/233; 279/83
[58] Field of Search .............. 409/232, 233, 234; 279/1 A, 76, 83, 84, 85, 86, 87, 77, 82; 408/239 A, 239 R

[56] References Cited

U.S. PATENT DOCUMENTS

| 2,374,919 | 5/1945 | Bruseth | 409/233 |
| 3,024,032 | 3/1962 | Nixon | 279/83 X |
| 3,085,812 | 4/1963 | Rosenthal | 279/76 X |
| 3,311,023 | 3/1967 | Kaiser | 409/233 X |
| 3,586,344 | 6/1971 | Nixon | 279/83 |

FOREIGN PATENT DOCUMENTS

| 2219279 | 12/1912 | Fed. Rep. of Germany | 279/77 |
| 1221528 | 7/1966 | Fed. Rep. of Germany | 279/77 |
| 2836343 | 2/1980 | Fed. Rep. of Germany | 279/1 A |
| 3019970 | 12/1981 | Fed. Rep. of Germany | 409/234 |
| 2382300 | 11/1978 | France | 409/233 |
| 50801 | 3/1966 | Poland | 279/86 |

OTHER PUBLICATIONS

Von Oberingenieur K. Schreyer, Nürnberg, "Stand der Normung von Spannzeugen für Fräswerkzeuge", Werkstattstechnik und Maschinenbau.
Clarkson, "Die Geschichte eines Clarkson-Patents" (The History of a Clarkson Patent), pp. A/1 and A/2.
A. R. Maslov, I. L. Fadyushin, "Tooling for NC Drilling and Milling Machines", Machines & Tooling (1974), pp. 13-16.
Wilhelm Bahmüller, "Selbstspannfutter für Fräser mit Zylinderschaft und Aussengewinde".

Primary Examiner—William R. Briggs
Attorney, Agent, or Firm—Spencer & Frank

[57] ABSTRACT

A chuck which can be clamped into a spindle of a machine tool and which is for use with a cutting tool having a shaft with a circular cross section. The chuck includes a body provided with a central bore having an end region in which the surface of the central bore is conically shaped for receiving the shaft of the cutting tool. The body includes a shaft projecting toward its rear side. The shaft is configured to be clamped into the spindle of the machine tool and is provided with a further bore. A clamping screw is disposed in the further bore of the shaft and has a head which is accessible from the front side of the body. A pull rod is displaceably disposed in the central bore and has a threaded end extending into the end region of the central bore for connection to the shaft of the cutting tool. An attachment mechanism is provided for attaching the pull rod to the clamping screw so that displacement of the clamping screw in the further bore causes displacement of the pull rod in the central bore.

9 Claims, 3 Drawing Figures

1

CHUCK FOR USE WITH A CUTTING TOOL

BACKGROUND OF THE INVENTION

The present invention relates to a chuck provided with a shaft which can be clamped into the spindle of a machine tool and which is equipped with a central bore for receiving a cutting tool shaft having a circular cross section, particularly a milling cutting tool.

Known chucks of this type, in adddition to the basic body provided with the shaft, generally include a centering tip, a collet, a cap nut to be screwed into the basic body and usually also a threaded ring. The diameter of the cap nut of these tools is so large that it is an impediment in many uses or precludes use of the tool in question. A somewhat smaller outer diameter is realized in a further known chuck of this type in that, instead of the screwed-on cap nut, it has a screwed-in clamping sleeve. However, the resulting reduction in its dimensions is not sufficient for many uses. All chucks equipped with a collet have the further drawback that only cutting tools having a cylindrical shaft can be clamped in.

SUMMARY OF THE INVENTION

It is an object of the present invention to provide a chuck of the above-mentioned type so that the portion of the chuck projecting from the spindle of a machine into which the chuck is clamped can be kept small, particularly with respect to the diameter of the projecting portion, and that tools having conical shafts, as well as cylindrical shafts, can be clamped into such a chuck.

The above and other objects are accomplished according to the invention wherein the chuck comprises a body having a front side and a rear side and being provided with a central bore having an outwardly conically widening end region for receiving at the front side a cutting tool shaft having a circular cross section. The body has a shaft portion extending towards the rear side and configured to be clamped into the spindle of a machine tool. A clamping screw is disposed in a further bore of the shaft of the body and has a head which is accessible from the front side (cutting tool side) of the body. A pull rod is displaceably disposed in the central bore and has a threaded end extending into the end region of the central bore for connection to the shaft of the cutting tool. An attachment mechanism is provided for attaching the pull rod to the clamping screw so that displacement of the clamping screw in the further bore causes displacement of the pulling rod in the central bore.

The chuck according to the present invention is preferably provided with a steeply conical shaft according to German Industrial Standard (DIN) 2080, as is customary in this field of the art, and is distinguished, in particular, by the fact that a portion of its basic body projecting from the spindle can be practically of any desired shape. That is, due to the novel construction of the chuck according to the invention, and depending on requirements, this projecting portion may be made very short or very long and, in particular, can have a relatively small diameter. A further advantage of the chuck according to the invention is that the means required to clamp in the cutting tool lie within the spindle when the tool is in use and thus are sealed against soiling. A change of tools can be effected by means of a screwdriver, hexagon head socket wrench or the like with the chuck in the inserted position.

With the novel chuck, cutting tools having a conical shaft, normally a Morse cone according to DIN 228, and matching internal thread can be clamped in directly. For cutting tools having a cylindrical shaft, which need not have an external tightening thread, a commercially available collet, equipped with a matching cone, is used as an intermediary attaching member.

DESCRIPTION OF THE PREFERRED EMBODIMENTS

Figures 1, 2:
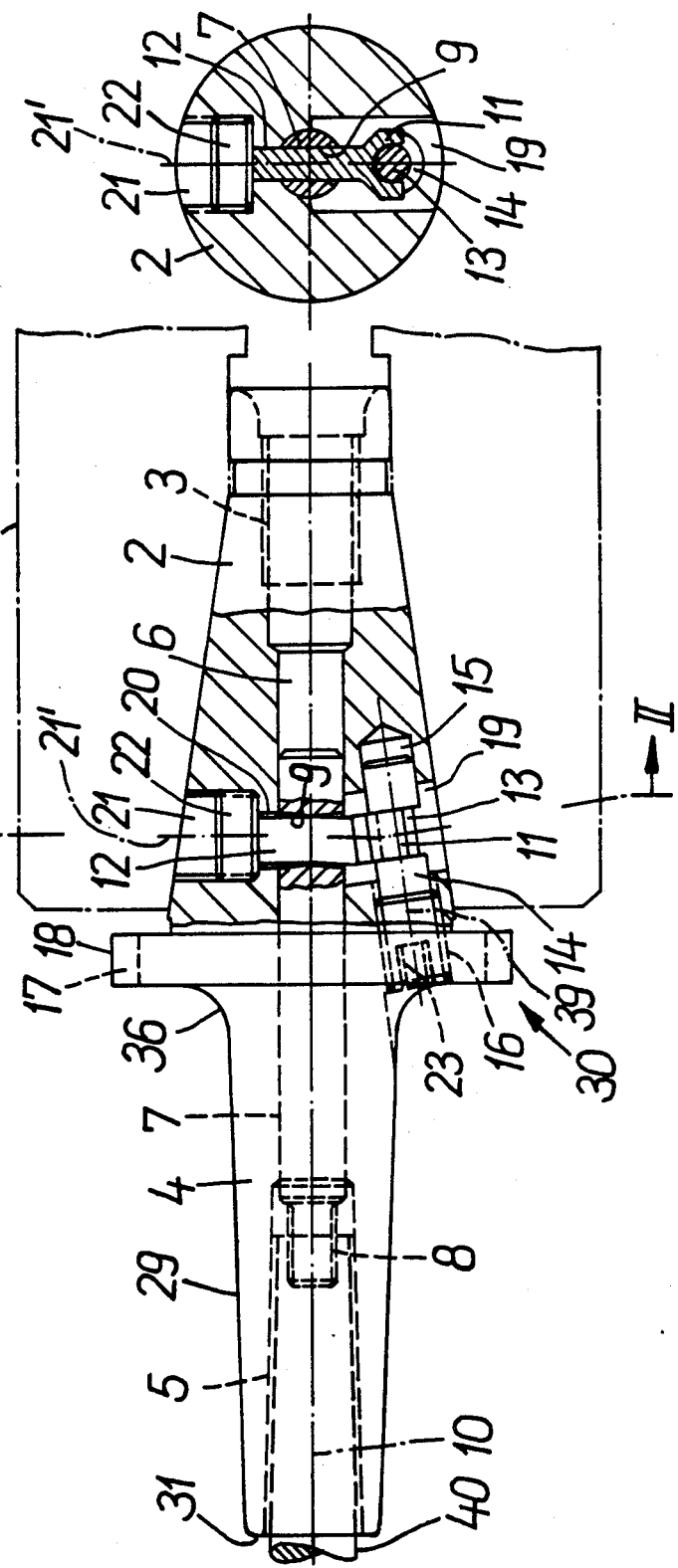
FIG. 1 is an axial sectional view of a preferred embodiment of the invention.
FIG. 2 is a sectional view along line II—II of FIG. 1.

FIG. 1 shows a chuck comprising a basic body 30 having a shaft 2 clamped into a spindle 1, indicated by dash-dot lines, of a machine tool (not shown). Shaft 2 has the shape of a steep cone provided with an internal tightening thread 3 according to DIN 2080, matching a mill cutting spindle head according to the standard ISO 50. A projecting portion 4 of basic body 30 extends out of spindle 1 and has a surface 29 that tapers toward a front side 31 of the chuck and is provided with a bore 5 having an internal, conically-shaped surface (a Morse taper MK 3, DIN 228, Design C) to accommodate a cutting tool or a collet. The maximum diameter of projecting portion 4 is preferably smaller than the largest diameter of shaft 2.

Between cone-shaped bore 5 and internal tightening thread 3 there extends a continuous cylindrical bore 6 in which a fitting pull rod 7 is disposed to be longitudinally displaceable. Pull rod 7 has an end which extends into cone-shaped bore 5 and which is provided with an external tightening thread 8. Near its other end, pull rod 7 is provided with a transverse recess 9. A lever 12 is disposed in recess 9 and is displaceable transversely to the longitudinal axis 10 of the chuck. Lever 12 has one end equipped with a fork 11 (see detail of FIG. 2) which constitutes an attachment means and which encloses, in a form-locking manner, a constricted, cylindrical region 13 of a clamping screw 14 mounted in a blind bore 15 which is inclined toward axis 10 of the chuck in a direction toward the rear side of the chuck. The axis 39 of clamping screw 14 is parallel to the slope of shaft 2. Blind bore 15 opens into a rounded or flared region 36 between a widened flange 18 which is provided with attachment grooves 17 and is disposed between shaft 2 and projecting portion 4 of basic body 30. In the region of its opening, blind bore 15 is provided with a thread 16 to accommodate a corresponding thread of clamping screw 14. Thread 16 projects beyond the remaining part of clamping screw 14 which extends into blind bore 15. In the area of constricted region 13 of clamping screw 14, between thread 16 and the other end of clamping screw 14, shaft 2 is provided with a recess 19 which extends perpendicularly to the slope of the surface of shaft 2 and which is spacious enough to permit mounting of lever 12 and provide play for its movement along chuck axis 10. The same applies for a recess 20 which opens into bore 6 on the opposite side from recess 19. Recess 20 is followed on the outside by a threaded bore 21 whose axis 21' is perpendicular to chuck axis 10 and which can be sealed by a screw-in plug 22.

A cutting tool is clamped into the chuck as follows: the tool shaft 40, or a collet (not shown), is screwed onto thread 8 of pull rod 7. Then clamping screw 14 is tightened via an internal hexagon head 23 by turning it clockwise. This moves lever 12 at the respective end face of its fork 11 further into spindle 1 and causes pull rod 7 to be carried along at its transverse recess 9 until the cutting tool has attained a sufficiently tight seat against the conical surface of bore 5. The clamping process requires only minor rotary movement of clamping screw 14. During the clamping, lever 12 is supported by closing plug 22. Due to the small displacement of the constricted region 13 of clamping screw 14 in the direction toward chuck axis 10 during clamping, sufficient play exists between part 13 and fork 11. Lever 12 causes the tension in pull rod 7 to be doubled at least. Modifications of this embodiment can be made by changing the angle of clamping screw 14 with respect to chuck axis 10. If, for example, projecting portion 4 has a small diameter, clamping screw 14 may extend parallel to chuck axis 10. The release of clamping screw 14 is effected in the reverse order by turning it counterclockwise. It is noted that it is a further function of the lever 12 to prevent the pull rod 7 from rotating and from dropping out of the bore 6.

Figure 3:
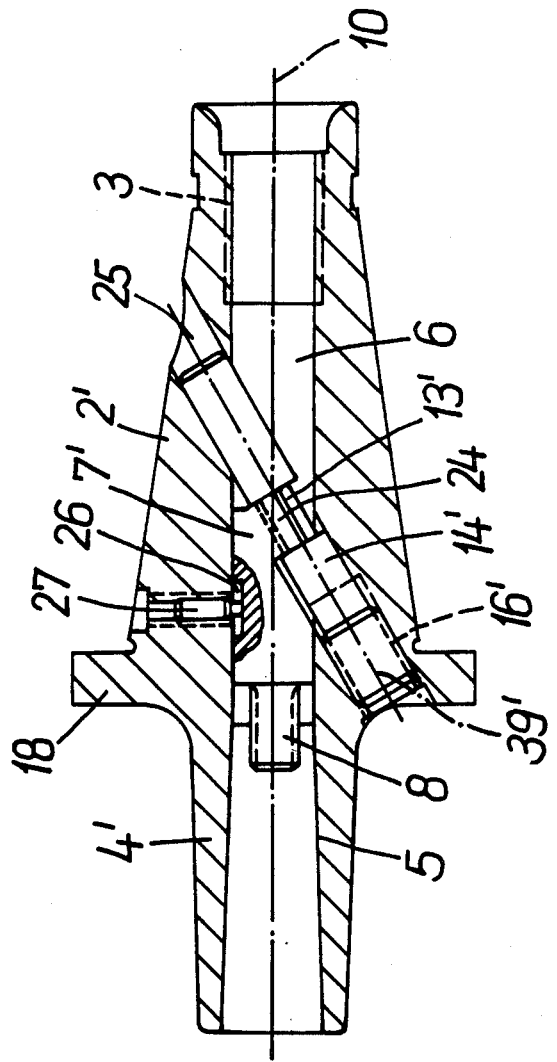
FIG. 3 is an axial sectional view of another preferred embodiment of the invention.

The embodiment according to FIG. 3 differs from that according to FIG. 1, in particular, in that clamping screw 14', which has the same features as clamping screw 14, engages directly an attachment means formed of a fork 24 at the end of pull rod 7' on the spindle side, rather than indirectly, with the intermediary of a lever, as it was the case in the embodiments of FIGS. 1 and 2. For this purpose, the angle between axis 39' of clamping screw 14' and chuck axis 10 is selected to be larger than the corresponding angle in the embodiment of FIG. 1 and the bore 25 accommodating clamping screw 14' is a through bore. Fork 24 and constricted region 13' of clamping screw 14' correspond to the previous embodiment. At its side opposite fork 24, pull rod 7' is provided with a longitudinal (axially parallel) groove 26 into which engages a matching cylindrical extension of a locking screw 27 which engages into a corresponding threaded bore in shaft 2'. This prevents pull rod 7' from rotation and from falling out of the chuck bore 6.

Moreover, in the embodiment according to FIG. 3, the projecting portion 4' is considerably shorter in that pull rod 7' is shortened. Further shortening can be realized in particular by modifying the embodiment according to FIG. 1 and correspondingly lengthening the clamping screw. Tests have shown that tools of the two described embodiments permit secure clamping of mill cutter shafts.

It will be understood that the above description of the present invention is susceptible to various modifications, changes and adaptations, and the same are intended to be comprehended within the meaning and range of equivalents of the appended claims.

What is claimed is:

1. A chuck adapted to be clamped into a spindle of a machine tool and adapted for use with a cutting tool having a shaft with a circular cross section which is provided with an internal tightening thread, comprising:

a body having a front side and a rear side and being provided with a central bore having an outwardly conically widening end region at said front side for receiving the shaft of the cutting tool; a shaft portion forming part of said body and extending toward said rear side and configured to be clamped into the spindle of the machine tool; and a further bore contained in said shaft portion;

a clamping screw disposed in the further bore of said shaft portion being provided with a radially constricted region and having a head accessible from the direction of said front side;

a pull rod displaceably disposed in the central bore and having a threaded end extending into the end region of the central bore for connection to the shaft of the cutting tool; and attachment means which includes a fork which passes around said constricted region of said clamping screw for coupling said pull rod to said clamping screw for causing displacement of said pull rod in said central bore in the direction of said rear side by said clamping screw upon tightening thereof.

2. A chuck as defined in claim 1, wherein said body includes a projecting portion extending from said shaft portion towards said front side, said projecting portion having a maximum diameter that is smaller than the largest diameter of the shaft portion of said body.

3. A chuck as defined in claim 2, wherein said projecting portion has an outer surface tapering toward said front side.

4. A chuck as defined in claim 2, wherein said body includes a radially projecting flange member disposed between said projecting portion and said shaft portion and includes a frontal face oriented towards said front side; the further bore passing through said radially projecting flange member and opening into said frontal face.

5. A chuck as defined in claim 1, wherein said shaft portion includes a recess connecting the central bore with the further bore and said attachment means extends radially beyond said pull rod into the recess, the recess being sufficiently spacious to permit movement of said attachment means parallel to an axial direction of the central bore.

6. A chuck as defined in claim 5, wherein said pull rod has a longitudinal axis and includes a recess transverse to said longitudinal axis and said attachment means includes a lever passing through the recess in said pull rod.

7. A chuck as defined in claim 1, wherein said central bore and said further bore have longitudinal axes, further wherein the longitudinal axis of the central bore and the longitudinal axis of the further bore are inclined towards one another in the direction toward said rear side.

8. A chuck as defined in claim 1, wherein said attachment means is disposed only in the central bore.

9. A chuck as defined in claim 1, and further including a locking screw supported in said body and extending into said central bore, wherein said pull rod has a longitudinal axis and includes a longitudinal groove extending parallel with said longitudinal axis and said locking screw is disposed for projecting into the groove.

* * * * *